(12) United States Patent
Li et al.

(10) Patent No.: US 12,293,546 B2
(45) Date of Patent: May 6, 2025

(54) INTERACTIVE DYNAMIC FLUID EFFECT PROCESSING METHOD AND DEVICE, AND ELECTRONIC DEVICE

(71) Applicant: Beijing Bytedance Network Technology Co., Ltd., Beijing (CN)

(72) Inventors: Qi Li, Beijing (CN); Xiaoqi Li, Beijing (CN); Jinglei Wang, Beijing (CN)

( * ) Notice: Subject to any disclaimer, the term of this patent is extended or adjusted under 35 U.S.C. 154(b) by 184 days.

(21) Appl. No.: 18/041,003

(22) PCT Filed: Aug. 9, 2021

(86) PCT No.: PCT/CN2021/111608
§ 371 (c)(1),
(2) Date: Feb. 8, 2023

(87) PCT Pub. No.: WO2022/033445
PCT Pub. Date: Feb. 17, 2022

(65) Prior Publication Data
US 2023/0368422 A1    Nov. 16, 2023

(30) Foreign Application Priority Data
Aug. 10, 2020    (CN) .......................... 202010796950.5

(51) Int. Cl.
*G06T 7/73*    (2017.01)
*G06F 3/01*    (2006.01)
(Continued)

(52) U.S. Cl.
CPC ............... *G06T 7/75* (2017.01); *G06F 3/012* (2013.01); *G06T 7/251* (2017.01); *G06T 19/006* (2013.01);
(Continued)

(58) Field of Classification Search
None
See application file for complete search history.

(56) References Cited

U.S. PATENT DOCUMENTS

| 10,592,087 B1 | 3/2020 | Kellum |
| 2007/0002386 A1 | 1/2007 | Iijima |

(Continued)

FOREIGN PATENT DOCUMENTS

| CN | 104539795 A | 4/2015 |
| CN | 107329671 A | 11/2017 |

(Continued)

OTHER PUBLICATIONS

Yu, Y., "How to Shoot Douyin Submarine Challenge?," Baidu, Available Online at https://jingyan.baidu.com/article/d3b74d648a534a5e77e609ea.html, Mar. 12, 2020, 17 pages.

(Continued)

*Primary Examiner* — Ryan M Gray
(74) *Attorney, Agent, or Firm* — Alleman Hall & Tuttle LLP

(57) ABSTRACT

Provided is an interactive dynamic fluid effect processing method, which includes: capturing a video and detecting position and pose change of a target object in the video; acquiring a position and pose mapping relationship between the target object and an object model corresponding to a first object displayed in a user display interface; determining position and pose change of the object model based on the position and pose change of the target object and the position and pose mapping relationship; and adjusting a position of a fluid displayed in the user display interface based on the position and pose change of the object model, and dynamically displaying movement change of the fluid in the user display interface.

17 Claims, 3 Drawing Sheets

(51) Int. Cl.
  *G06T 7/246* (2017.01)
  *G06T 19/00* (2011.01)
  *G06T 19/20* (2011.01)
(52) U.S. Cl.
  CPC .......... *G06T 19/20* (2013.01); *G06T 2200/24* (2013.01); *G06T 2207/30201* (2013.01); *G06T 2210/24* (2013.01); *G06T 2219/2012* (2013.01)

(56) References Cited

U.S. PATENT DOCUMENTS

| | | | |
|---|---|---|---|
| 2011/0161852 | A1 | 6/2011 | Vainio et al. |
| 2015/0077398 | A1 | 3/2015 | Yairi et al. |
| 2015/0242545 | A1* | 8/2015 | Cho ........................ G06F 17/13 703/2 |
| 2020/0380714 | A1* | 12/2020 | Yeoman .................... G06T 7/70 |
| 2021/0279965 | A1* | 9/2021 | Yao ........................ G06T 19/006 |
| 2021/0390749 | A1* | 12/2021 | Stomakhin .............. G06T 13/40 |
| 2024/0282130 | A1* | 8/2024 | Green ..................... G06T 11/60 |

FOREIGN PATENT DOCUMENTS

| | | |
|---|---|---|
| CN | 108564600 A | 9/2018 |
| CN | 108830928 A | 11/2018 |
| CN | 109803165 A | 5/2019 |
| CN | 109885163 A | 6/2019 |
| CN | 110930487 A | 3/2020 |
| CN | 111107280 A | 5/2020 |

OTHER PUBLICATIONS

ISA China National Intellectual Property Administration, International Search Report Issued in Application No. PCT/CN2021/111608, Nov. 15, 2021, WIPO, 6 pages.
China National Intellectual Property Administration, Office Action and Search Report Issued in Application No. 202010796950.5, Apr. 28, 2023, 36 pages.

* cited by examiner

INTERACTIVE DYNAMIC FLUID EFFECT PROCESSING METHOD AND DEVICE, AND ELECTRONIC DEVICE

CROSS REFERENCE OF RELATED APPLICATION

This application is a national phase application of PCT international patent application PCT/CN2021/111608, filed on Aug. 9, 2021 which claims priority to Chinese Patent Application 202010796950.5, titled "INTERACTIVE DYNAMIC FLUID EFFECT PROCESSING METHOD AND DEVICE, AND ELECTRONIC DEVICE", filed on Aug. 10, 2020 with the China National Intellectual Property Administration, both of which are incorporated herein by reference in their entireties.

FIELD

The present disclosure relates to the technical field of computers, and in particular to an interactive dynamic fluid effect processing method, an interactive dynamic fluid effect processing apparatus and an electronic device.

BACKGROUND

With the rapid development of computer technology and communication technology, various applications based on terminal devices have been widely used, thereby greatly enriching people's daily life. A user may entertain and share daily life with other users through various applications. In order to enhance interest, interaction modes are usually added to game or video capturing applications to improve user experience.

However, in the conventional technology, most of the interaction modes applied to the mobile terminal use finger touch screen mode for interaction input. The interaction mode is simple and not interesting.

SUMMARY

The present disclosure provides an interactive dynamic fluid effect processing method, an interactive dynamic fluid effect processing apparatus and an electronic device, to solve the problems in the conventional technology.

In a first aspect, an interactive dynamic fluid effect processing method is provided. The method includes: capturing a video and detecting position and pose change of a target object in the video; acquiring a position and pose mapping relationship between the target object and an object model corresponding to a first object displayed in a user display interface; determining position and pose change of the object model based on the position and pose change of the target object and the position and pose mapping relationship; and adjusting a position of a fluid displayed in the user display interface based on the position and pose change of the object model, and dynamically displaying movement change of the fluid in the user display interface.

In a second aspect, an interactive dynamic fluid effect processing apparatus is provided. The apparatus includes: a capturing module configured to capture a video and detect position and pose change of a target object in the video; an acquiring module configured to acquire a position and pose mapping relationship between the target object and an object model corresponding to a first object displayed in a user display interface; a determining module configured to determine position and pose change of the object model based on the position and pose change of the target object and the position and pose mapping relationship; and an adjusting module configured to adjust a position of a fluid displayed in the user display interface based on the position and pose change of the object model, and dynamically display movement change of the fluid in the user display interface.

In a third aspect, an electronic device is provided. The electronic device includes one or more processors and a memory storing one or more programs. The one or more programs, when executed by the one or more processors, cause the electronic device to perform the interactive dynamic fluid effect processing method described in the first aspect.

In a fourth aspect, a computer-readable medium is provided. The computer-readable medium stores computer instructions. The computer instructions, when executed by a computer, cause the computer to perform the interactive dynamic fluid effect processing method described in the first aspect.

The beneficial effects of the technical solution provided by the present disclosure are described as follows. According to the interactive dynamic fluid effect processing method, the interactive dynamic fluid effect processing apparatus and the electronic device provided in the embodiments of the present disclosure, a video is captured and position and pose change of a target object in the video is detected, a position and pose mapping relationship between the target object and an object model corresponding to a first object displayed in a user display interface is acquired, position and pose change of the object model is determined based on the position and pose change of the target object and the position and pose mapping relationship; and a position of a fluid displayed in the user display interface is adjusted based on the position and pose change of the object model, and movement change of the fluid is dynamically displayed in the user display interface. By adopting the technical solutions provided by the present disclosure, the movement change of the object and the fluid in the user display interface is controlled based on the position and pose change of the target object in the captured video. The interaction mode is novel and interesting, which can improve the user experience.

BRIEF DESCRIPTION OF THE DRAWINGS

In order to more clearly illustrate the technical solutions according to the embodiments of the present disclosure, the drawings to be used in the description of the embodiments according to the present disclosure are briefly introduced below.

DETAILED DESCRIPTION

Figure 1:
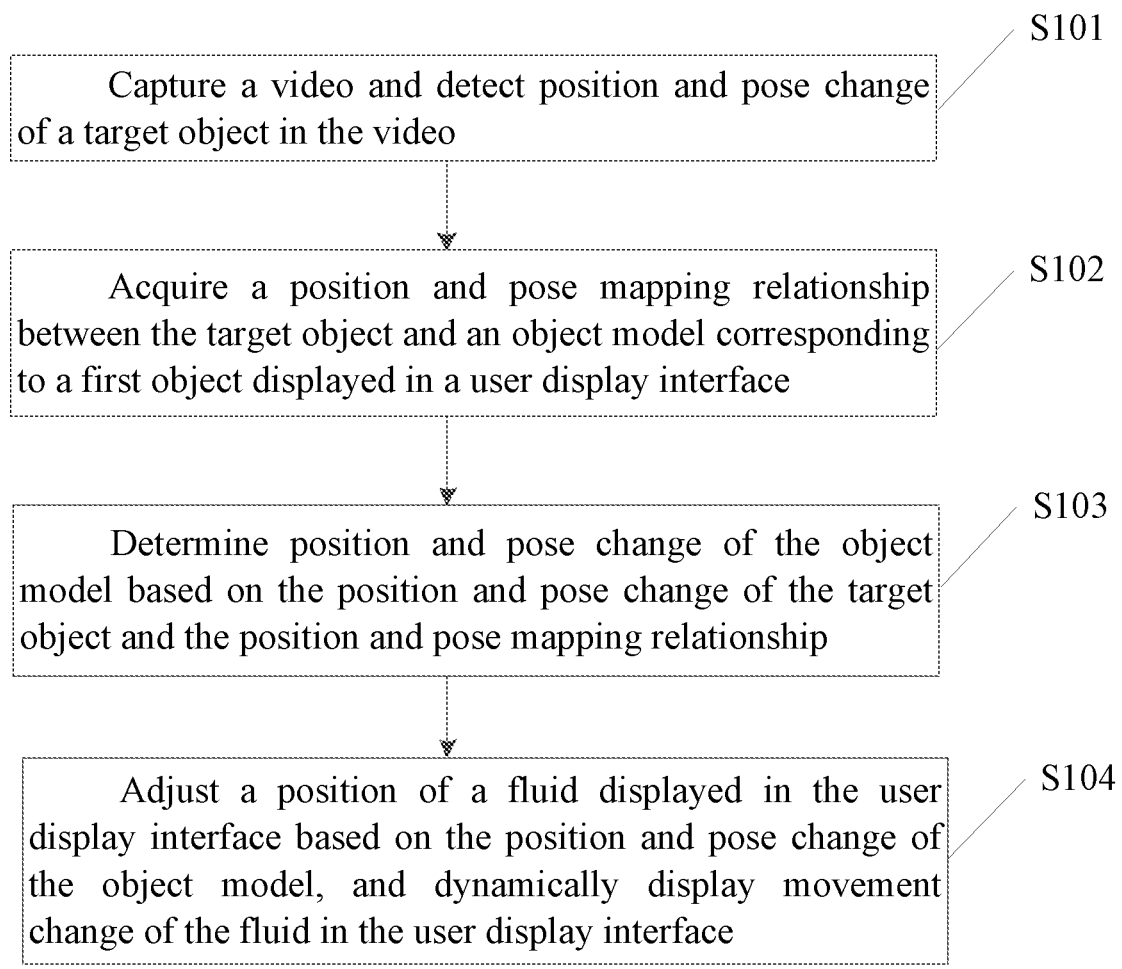
FIG. 1 is a schematic flowchart of an interactive dynamic fluid effect processing method according to an embodiment of the present disclosure.

Embodiments of the present disclosure will be described in more detail below with reference to the drawings.

Although some embodiments according to the present disclosure are shown in the drawings, it should be understood that the present disclosure may be implemented in various forms and should not be construed as limited to the embodiments set forth herein. These embodiments are provided for a thorough and complete understanding of the present disclosure. It should be understood that the drawings and embodiments according to the present disclosure are only for illustration rather than intended to limit the protection scope of the present disclosure.

It should be understood that the steps described in the method embodiments according to the present disclosure may be performed in a different order and/or performed in parallel. Furthermore, method embodiments may include additional steps and/or illustrated steps may not be performed. The scope according to the present disclosure is not limited in this regard.

Herein, the term "including" and its variants are open-ended inclusion, i.e., "including but not limited to". The term "based on" is "based at least in part on". The term "an embodiment" indicates "at least one embodiment." The term "another embodiment" indicates "at least one additional embodiment". The term "some embodiments" indicates "at least some embodiments". Relevant definitions of other terms are given in the description below.

It should be noted that concepts such as "first" and "second" herein are for distinguishing apparatuses, modules or units only, neither defining that these apparatuses or units must be different from each other nor defining the order or interdependence of functionalities performed by these apparatuses, modules or units.

It should be noted that the determiners such as "a" and "a plurality" herein are illustrative rather than restrictive. It should be understood by those skilled in the art that unless the context clearly dictates otherwise, "a" and "a plurality" should be construed as "one or more".

The name of a message or information exchanged between multiple apparatuses according to the embodiments of the present disclosure are only for illustrative purpose rather than limiting the scope of the message or information.

The technical solution of the present disclosure and how the technical solution of the present disclosure solves the above technical problems are described in detail below with specific embodiments. The following specific embodiments may be combined with each other, and the same or similar concepts or processes may not be repeated in some embodiments. The embodiments of the present disclosure will be described below in combination with the accompanying drawings.

The technical solutions of the present disclosure may be applied to applications involving the production, application and use of dynamic fluid effect. The technical solutions of the present disclosure may be applied to terminal devices, which may include mobile terminals or computer devices. The mobile terminals may include, for example, smart phones, handheld computers, tablet computers, wearable devices with display screens, and so on. The computer devices may include, for example, desktops, laptops, all-in-one computers, smart televisions, and the like. According to the technical solutions of the present disclosure, the first object and the fluid are modeled in the three-dimensional space, an effect image obtained by rendering the object model and the fluid model is displayed in the two-dimensional user display interface (for simplicity, hereinafter, the effect image obtained by rendering the model of the first object displayed in the user display interface is referred to as "the first object", similarly, the effect image obtained by rendering the model of the fluid displayed in the user display interface is referred to as "the fluid"). The first object may contact with the fluid in the interface, for example, the first object carries the fluid. When the first object moves due to an external force, the fluid carried by the first object moves accordingly. When the first object collides with the fluid, movement change of the fluid may be dynamically displayed in the user display interface. For another example, the fluid is outside the first object, when the fluid moves due to an external force, the fluid collides with the first object, the movement change of the fluid is dynamically displayed in the user display interface. It should be understood by those skilled in the art that this disclosure does not define the position and movement of the first object and the fluid.

FIG. 1 is a schematic flowchart of an interactive dynamic fluid effect processing method according to an embodiment of the present disclosure. As shown in FIG. 1, the method may include steps S101 to S104.

Step S101, capture a video and detect position and pose change of a target object in the video.

Specifically, when a video capturing instruction is detected, a terminal device may invoke a video capturing apparatus (for example, a camera) of the terminal device to capture a video. A duration of video capturing may be a preset time period, or may be determined according to a video capturing start instruction and a video capturing end instruction, which is not limited in this disclosure. After the video is captured, the terminal device detects the target object in the captured video. The target object may be a specific object in the video, which includes, but not limited to, a human face, a human head, a human hand, etc. Optionally, in a case that the target object is a human face, a human face detection algorithm may be used to detect a human face in each image frame in the video. In a case that the target object is a human head, a head detection algorithm may be used to detect a human head in each image frame in the video.

The detecting position and pose change of a target object may specifically include detecting position and pose change of a key point in the target object, and determining the position and pose change of the target object based on the position and pose change of the key point.

In an embodiment, taking the target object being a human face as an example, the key point may include a center point of the human face, the terminal device detects position and pose change of the center point of the human face in each image frame of the captured video, and determines position and pose change of the human face based on the position and pose change of the center point of the human face.

Step S102, acquire a position and pose mapping relationship between the target object and an object model corresponding to a first object displayed in a user display interface.

The user display interface may be a display interface in an application. The solution provided by the embodiments of the present disclosure may be implemented as an application or a functional plug-in of an application. When detecting a starting instruction for the application from the user, the terminal device invokes the application to display the user display interface. Alternatively, when detecting a triggering instruction (such as clicking a virtual button) for the function plug-in of the application from the user, the terminal device displays the user display interface. The user display interface may also display images of the first object and the fluid. In an embodiment, the terminal device may model the first object and the fluid in the three-dimensional space and project effect images, obtained by rendering the object model and the fluid model, into the two-dimensional user display interface, to display the first object and the fluid in the user display interface.

The first object may be an object with relatively stable shape and volume in movement and under the action of force, such as a rigid body, a soft body. The first object may contact with the fluid in the interface. For example, the fluid may be carried by the first object. When the first object moves, the fluid carried by the first object moves accordingly, and a dynamic effect is presented in the user display interface.

Specifically, the terminal device detects the target object from the video, and acquires the preset position and pose mapping relationship between the target object and the object model corresponding to the first object displayed in the user display interface. Since a display position of the first object in the user display interface is related to a position of the target object in the user display interface, when the position and pose change of the target object occurs, the position and pose change of the first object also occurs. In addition, the terminal device determines the position and pose change of the object model according to the position and pose mapping relationship, so as to present an effect that the target object moves and the first object moves with the target object in the user display interface.

Step S103, determine position and pose change of the object model based on the position and pose change of the target object and the position and pose mapping relationship.

A display position of the first object in the user display interface is related to a position of the target object in the user display interface, the position and pose mapping relationship between the target object and the object model are set in advance, therefore, the terminal device may determine the position and pose change of the object model based on the position and pose change of the target object and the position and pose mapping relationship. The position and pose change may include a change amount of position and pose, or the changed position and pose.

Step S104, adjust a position of a fluid displayed in the user display interface based on the position and pose change of the object model, and dynamically display movement change of the fluid in the user display interface.

Taking the first object carrying the fluid as an example, when the position and pose change of the target object occurs, because the display position of the first object in the user display interface is related to the position of the target object in the user display interface, accordingly, the position and pose change of the first object occurs, and drives the fluid to move. A position of the fluid also changes under the action of external forces. The terminal device may adjust the position of the fluid in the user display interface based on the position and pose change of the first object, and display a dynamic effect, that the object model of the first object drives the fluid to move, in the user display interface.

In an embodiment, taking the target object being the human face as an example, position and pose change of the human face occurs, accordingly, position and pose change of the first object also occurs. The first object carries the fluid, and the position and pose change of the first object makes the fluid carried by the first object subject to external force, thus making the position of the fluid change. The terminal device may determine the position and pose change of the first object based on the position and pose change of the human face, and further adjust the position of the fluid based on the position and pose change of the first object, to display a dynamic effect that the fluid moves in the user display interface.

When the terminal device displays the first object in the user display interface, a specific display position may be determined by the following embodiment.

In a possible implementation, the method further includes: receiving a display triggering operation for the user display interface from a user; displaying the user display interface, and invoking a video capturing apparatus to capture a video; detecting a target object in the video, and acquiring a position of the detected target object in the user display interface; determining an initial display position of the first object in the user display interface based on the position of the target object in the user display interface; and displaying the first object in the user display interface based on the initial display position.

In practice, when initially capturing the video, the terminal device displays the user display interface according to the display triggering operation for the user display interface from the user, and invokes the video capturing apparatus to capture the video. The terminal device may determine an initial display position of the target object, and then determine an initial display position of the first object in the user display interface based on a position association relationship between the target object and the first object, and display the first object in the user display interface based on the initial display position. In addition, the terminal device may display the fluid while displaying the first object, for example, the terminal device may display the first object carrying the fluid in the user display interface. In another embodiment, the terminal device may display the fluid after displaying the first object, for example, displaying a dynamic effect that the fluid is injected into the first object in the user display interface. The present disclosure does not limit a display order and a specific display mode of the first object and the fluid.

The position association relationship may include center point overlapping, the terminal device displays the center point position of the target object to be overlapped with the center point position of the first object in the user display interface. For example, taking the first object carrying the fluid as an example, the terminal device may associate the center point position of the target object with the center point position of the first object carrying the fluid, and display the center point position of the target object to be overlapped with the center point position of the first object carrying the fluid in the user display interface. In another embodiment, the position association relationship may also include maintaining a specific distance d between the center point position of the target object and the center point position of the first object. The terminal device displays the center point position of the target object to be away from the center point position of the first object for a specific distance d in the user display interface. For example, the terminal device may determine the center point position of the first object based on the center point position of the target object and the specific distance d, and display the first object in the user display interface according to the determined position.

In an embodiment, the object model of the first object may be obtained by modeling the first object in the three-dimensional space based on feature information of the first object (such as size, shape, color).

In a possible implementation, the detecting position and pose change of a target object in the video in step S101 may include detecting a position and pose change amount of the target object in the video. Furthermore, step S103 may include determining a position and pose change amount of the object model corresponding to the first object based on the position and pose change amount of the target object and the position and pose mapping relationship. The adjusting a position of a fluid displayed in the user display interface based on the position and pose change of the object model may include: adjusting the position of the fluid displayed in the user display interface based on the position and pose change amount of the object model.

In practice, the terminal device may detect a position and pose change amount of the target object, determine a position and pose change amount of the object model based on the position and pose change amount of the target object and the position and pose mapping relationship between the target object and the object model, determine the position and pose of the object model after the position and pose change of the object model occurs based on the position and pose change amount of the object model, and adjust the position of the fluid displayed in the user display interface based on the position and pose of the object model after the position and pose change of the object model occurs.

In the embodiment of the present disclosure, the position and pose change amount of the object model corresponding to the first object may be determined based on the position and pose change amount of the target object, and the position of the fluid may be adjusted based on the position and pose change amount of the object model, so that the adjusted position of the fluid is more accurate and a better dynamic effect may be displayed.

In a possible implementation, the detecting a position and pose change amount of the target object in the video in step S101 may include detecting a position change amount and a pose change amount of the target object in the video. The position and pose mapping relationship includes a first mapping relationship between the position change amount of the target object and a position change amount of the object model, and a second mapping relationship between the pose change amount of the target object and a pose change amount of the object model. The determining a position and pose change amount of the object model based on the position and pose change amount of the target object and the position and pose mapping relationship may include: determining the position change amount of the object model based on the position change amount of the target object and the first mapping relationship; and determining the pose change amount of the object model based on the pose change amount of the target object and the second mapping relationship.

In practice, position and pose information may include position information and pose information. The terminal device may determine the position and pose of the target object in the three-dimensional space based on a two-dimensional image of the target object detected in the video. The pose of the target object may be rotation angles of the target object in three directions including x axis, y axis and z axis, which may be called as an azimuth angle, a pitch angle and a roll angle respectively. The terminal device may estimate the position and pose of the target object in the three-dimensional space based on the two-dimensional image of the target object. For example, a pose of the human head may be estimated by using a head pose estimation algorithm based on a face image. The position of the target object may be a position coordinate or a position vector of the target object in the three-dimensional space determined based on the position of the target object in the two-dimensional image. The terminal device may establish the first mapping relationship between the position change amount of the target object in the three-dimensional space and the position change amount of the object model corresponding to the first object, and establish the second mapping relationship between the estimated pose change amount of the target object in the three-dimensional space and the pose change amount of the object model, determine the position change amount of the object model based on the position change amount of the target object, and determine the pose change amount of the object model based on the pose change amount of the target object.

In an example, the position change amount and the pose change amount of the object model corresponding to the first object in the three-dimensional space may be determined based on the estimated position change amount and the estimated pose change amount of the target object in the three-dimensional space as follows:

$$\Delta p_s = \omega \Delta p_f \quad (1)$$

$$\Delta q_s = \Delta q_f \quad (2)$$

$\Delta p_f$ represents the position change amount of the target object in the three-dimensional space; $\Delta p_s$ represents the position change amount of the object model corresponding to the first object in the three-dimensional space; CO represents a scale parameter, which may be a preset value, and may be used to adjust a movement speed of the object model in the three-dimensional space; $\Delta q_f$ represents the pose change amount of the target object in the three-dimensional space; and $\Delta q_s$ represents the pose change amount of the object model in the three-dimensional space. Formula (1) may be used as the first mapping relationship and Formula (2) may be used as the second mapping relationship.

In the embodiment of the present disclosure, the position change amount and the pose change amount of the object model may be determined based on the position change amount and the pose change amount of the target object, so that a dynamic effect, that the object model moves with the movement of the target object, may be displayed in the user display interface.

In a possible implementation, the adjusting the position of the fluid displayed in the user display interface based on the position and pose change amount of the object model in step S104 may include: determining a position of each model particle of the object model based on the position change amount of the object model; and performing following operations for each fluid particle in the fluid: acquiring a position of the fluid particle; determining the model particle that collides with the fluid particle based on the position of each model particle and the position of the fluid particle; and adjusting the position of the fluid particle based on the position of the model particle that collides with the fluid particle.

In practice, when the first object moves with the position and pose change of the target object in the video, the fluid collides with the first object. The terminal device may determine the position of the object model after the position of the object model is changed based on the position change amount of the object model, and determine the position of each model particle in the object model based on the changed position of the object model. Specifically, the object model corresponding to the first object may be exported as point cloud data through 3D modeling software (for example, 3Dmax, Maya, etc.). The point cloud data is data in point cloud format (the suffix of the point cloud format file is .ply). Each piece of point cloud data corresponds to one point, and each point corresponds to one model particle. Each piece of point cloud data may include position and normal direction information of the corresponding point in the model. The normal direction information may refer to the outside of the object model.

When the first object moves, the fluid carried by the first object moves accordingly. The terminal device may simulate the movement of the fluid based on the magnitude of the external force acting on the fluid particle, estimate the position of each fluid particle after the movement, to obtain the estimated position as the position of each fluid particle corresponding to the fluid. Optionally, the terminal device may calculate the estimated position of each fluid particle by position based fluids (PBF) simulation.

When the fluid moves with the movement of the first object, some or all of the fluid particles in the fluid may collide with the model particle. For the fluid particle that collides with the model particle, the terminal device may adjust the position of the fluid particle based on the position of the model particle that collides with the fluid particle, and use the adjusted position as the position of the fluid particle displayed in the user display interface after the fluid particle moves, so that movement change of the fluid may be dynamically displayed in the user display interface.

When the fluid collides with the first object, model particles are arranged near the fluid particles. For each fluid particle, which model particles collide with the fluid particle and which model particles do not collide with the fluid particle may be determined based on the estimated position of the fluid particle and the position of each model particle.

For each fluid particle, a distance between the fluid particle and each model particle may be calculated based on the position of the fluid particle and the position of the model particle. The model particle adjacent to the fluid particle may be determined based on the distance. The terminal device may take the model particle closest to the fluid particle as an adjacent model particle of the fluid particle. Because the adjacent model particle of the fluid particle is the model particle most likely to collide with the fluid particle, if the distance between the adjacent model particle and the fluid particle is less than a preset distance, the adjacent model particle is the model particle that collides with the fluid particle, and the terminal device may get the position of the model particle that collides with the fluid particle.

For the fluid particle that do not collide with the model particle, the terminal device estimates the position of the fluid particle before the movement of the fluid particle to obtain the estimated position (for example, by using the PBF algorithm), and uses the estimated position as the position of the fluid particle displayed in the user display interface after the fluid particle moves. Therefore, the movement change process of the fluid particle displayed in the user display interface is that the fluid particle moves from the position before the movement to the estimated position.

If the position and pose of the target object does not continue to change, the fluid continues to move under inertial action, the terminal device may estimate the position of the fluid particle, after moving under inertial action, based on the current position of the fluid particle, simulate the movement of the fluid particle, and display the movement of the fluid particle in the user display interface. Optionally, the terminal device may simulate the movement of fluid particle under inertial action with the PBF algorithm.

In a possible implementation, for each fluid particle that collides with the model particle, the adjusting the position of the fluid particle based on the position of the model particle that collides with the fluid particle may include: determining a position correction amount of the fluid particle based on the position of the fluid particle and the position of the model particle that collides with the fluid particle; and adjusting the position of the fluid particle that collides with the model particle based on the position correction amount, to dynamically display the movement change of the fluid in the user display interface.

In practice, if some or all of the fluid particles collide with the object model, the positions of these fluid particles may be changed due to the collision. Therefore, the positions of these fluid particles are no longer the estimated position obtained during the simulation of fluid movement, and the positions of these particles needs to be adjusted. For each fluid particle that collides with the model particle, the position of the fluid particle and the position of the model particle that collides with the fluid particle may be position vectors in the three-dimensional space. The terminal device calculates a difference between the two position vectors, and determines the position correction amount of the fluid particle based on the difference between the two position vectors. The terminal device adjusts the position of the fluid particle that collides with the model particle based on the position correction amount, and takes the adjusted position as the position of the fluid particle after collision. The user display interface displays that the fluid particle moves from the position before the movement to the position after the adjustment, so as to present the dynamic change effect of the fluid in the user display interface.

In a possible implementation, the determining a position correction amount of the fluid particle based on the position of the fluid particle and the position of the model particle that collides with the fluid particle may include: acquiring normal direction information of the model particle that collides with the fluid particle; acquiring a first weight corresponding to the normal direction information and a second weight corresponding to a first distance between the fluid particle and the model particle that collides with the fluid particle; and determining the position correction amount of the fluid particle based on the first distance, the normal direction information, the first weight, the second weight and a preset distance r.

In practice, the terminal device may export the object model as point cloud data. Each piece of point cloud data corresponds to one model particle. Each piece of point cloud data may include position and normal direction information of the model particle in the model. The normal direction information may refer to the outside of the object model. The terminal device may preset the first weight and the second weight. The first weight may be a weight corresponding to the normal direction information of the model particle colliding with the fluid particle, and the second weight may be a weight corresponding to the first distance between the fluid particle and the model particle colliding with the fluid particle. The terminal device determines the position correction amount of the fluid particle based on the first distance between the fluid particle and the model particle colliding with the fluid particle, the normal direction information, the first weight, the second weight and the preset distance r.

In an embodiment, by modeling the first object as an object model and exporting the object model as point cloud data, the position and normal direction information of the model particle in the model (also known as a model coordinate system) may be obtained. In order to calculate the position correction amount of the fluid particle, the terminal device may perform coordinate transformation on the position and normal direction information of the model particle, to transform the model coordinate system to a coordinate system for calculating the position correction amount of the fluid particle (also known as a fluid coordinate system), and coordinate transformation of the model particle may be performed by the following formulas (3)-(4):

$$P_\omega = RP_m + T \qquad (3)$$

$$n_\omega = Rn_m \qquad (4)$$

$P_ω$ represents the position of each model particle in the fluid coordinate system; $P_m$ represents the position of each model particle in the model coordinate system; $n_ω$ represents a normal vector of each model particle in the fluid coordinate system; $n_ω$ represents a normal vector of each model particle in the model coordinate system; R represents a rotation matrix; T represents a translation vector, and R and T may be configured in advance according to specific needs.

After transforming the position and normal direction information of the model particle to the fluid coordinate system, the position correction amount of the fluid particle may be calculated by the following formula:

$$\Delta p = (r - \|d\|) * abs(n_ω \cdot d) * (-\omega_1 n_ω + \omega_2 d) \quad (5)$$

$$d = p - x \quad (6)$$

Δp represents the position correction amount to be calculated, r represents the preset distance, d represents the difference between the position vector of the fluid particle and the position vector of the model particle that collides with the fluid particle in the three-dimensional space, ‖d‖ represents the distance between the fluid particle and the model particle that collides with the fluid particle in the three-dimensional space, p represents the position vector of the fluid particle, and X represents the position vector of the model particle that collides with fluid particle; $n_ω$ represents the normal vector of the model particle colliding with the fluid particle in the fluid coordinate system, $\omega_1$ represents the first weight and $\omega_2$ represents the second weight. By using the above formulas (5) and (6), the position correction amount Δp of the fluid particle that collides with the first object may be obtained.

After obtaining the position correction amount of the fluid particle that collides with the model particle, the position of the fluid particle that collides with the model particle is adjusted based on the position correction amount and the following formula:

$$p^{t+1} = p^t + \Delta p \quad (7)$$

$p^t$ represents the position of the fluid particle before the position adjustment (for example, the estimated position calculated by the PBF algorithm), $p^{t+1}$ represents the position correction amount, $p^{t+1}$ represents the position of the fluid particle after the position adjustment, t represents the moment corresponding to the position before the position adjustment, and t+1 represents the moment corresponding to the position after the position adjustment.

Based on the technical solution provided by the disclosure above, the technical solution is explained below with a specific embodiment. The specific embodiment and its content is only intended to explain a possible implementation of the disclosed solution, and do not represent all the implementations of the disclosed solution.

Figure 2:
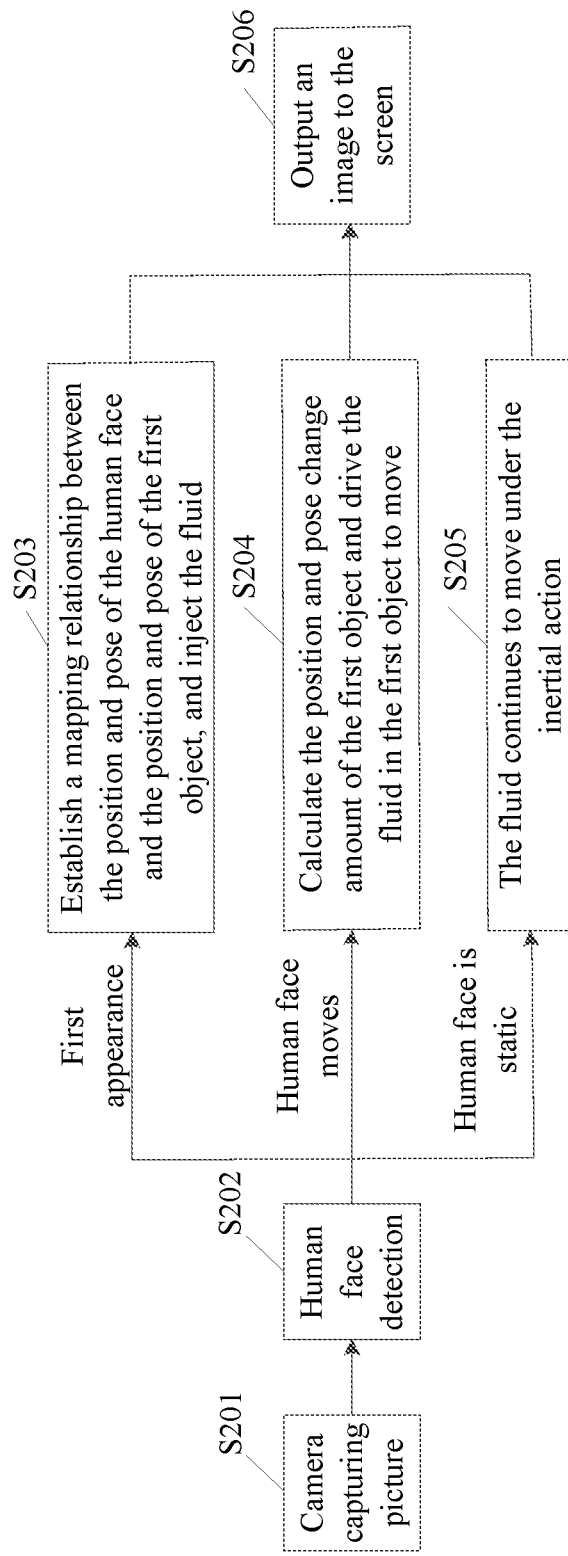
FIG. 2 is a schematic diagram of performing dynamic fluid effect processing through face detection according to an embodiment of the present disclosure.

As shown in FIG. 2, step S201 is performed, when detecting a camera starting instruction on a user display interface, a terminal device invokes a camera to capture a video (a camera capturing picture as shown in the drawing).

Step S202 is performed, position and pose change of a target object in the video is detected. If the target object is a human face, position and pose change of the human face is detected ("human face detection" as shown in the drawing).

Step S203 is performed, when the human face appears in the user display interface for the first time ("first appearance" as shown in the drawing), an initial display position of a first object in the user display interface is determined based on a display position of the human face in the user display interface detected for the first time, and a fluid is displayed in the first object (for example, the fluid is injected into the first object).

Step S204 is performed, when the human face moves, the position and pose change of the human face is acquired, a position and pose change amount of the first object is determined based on the position and pose change of the human face and a position and pose mapping relationship ("calculate the position and pose change amount of the first object" as shown in the drawing). Since the movement of the first object may drive the fluid in the first object to move, the terminal device may adjust the position of the fluid in the first object based on the position and pose change amount of the first object, and dynamically display the movement change of the fluid in the user display interface ("drive the fluid in the first object to move" as shown in the drawing).

Step S205 is performed, when the human face is static, the terminal device may determine the position of the fluid after the movement with the PBF algorithm, and simulate a state that the fluid continues to move under the inertial action ("the fluid continues to move under the inertial action" as shown in the drawing).

In the above steps, the movement of the human face, the movement of the first object, and the movement of the fluid are displayed in the user display interface. As shown in step S206, the terminal device outputs an image to the screen.

According to the interactive dynamic fluid effect processing method provided in the embodiments of the disclosure, a video is captured and position and pose change of a target object in the video is detected, a position and pose mapping relationship between the target object and an object model corresponding to a first object displayed in a user display interface is acquired, position and pose change of the object model is determined based on the position and pose change of the target object and the position and pose mapping relationship; and a position of a fluid displayed in the user display interface is adjusted based on the position and pose change of the object model, and movement change of the fluid is dynamically displayed in the user display interface. By adopting the technical solutions provided by the present disclosure, the movement change of the object and the fluid in the user display interface is controlled based on the position and pose change of the target object in the captured video. The interaction mode is novel and interesting, which can improve the user experience.

Figure 3:
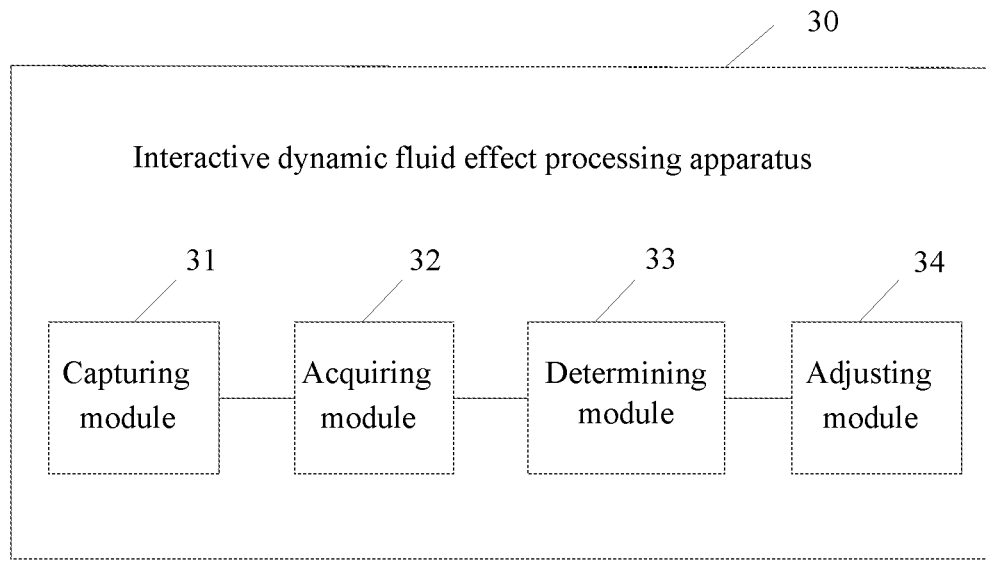
FIG. 3 is a schematic structural diagram of an interactive dynamic fluid effect processing apparatus according to an embodiment of the present disclosure.

Based on the same principle as the method shown in FIG. 1, the embodiment of the present disclosure also provides an interactive dynamic fluid effect processing apparatus 30, as shown in FIG. 3, the interactive dynamic fluid effect processing apparatus 30 may include: a capturing module 31 configured to capture a video and detect position and pose change of a target object in the video; an acquiring module 32 configured to acquire a position and pose mapping relationship between the target object and an object model corresponding to a first object displayed in a user display interface; a determining module 33 configured to determine position and pose change of the object model based on the position and pose change of the target object and the position and pose mapping relationship; and an adjusting module 34 configured to adjust a position of a fluid displayed in the user display interface based on the position and pose change of the object model, and dynamically display movement change of the fluid in the user display interface.

In a possible implementation, the apparatus 30 further includes a receiving module configured to: receive a display triggering operation for the user display interface from a user; display the user display interface, and invoke a video capturing apparatus to capture a video; detect a target object in the video, and acquire a position of the detected target object in the user display interface; determine an initial display position of the first object in the user display interface based on the position of the target object in the user display interface; and display the first object in the user display interface based on the initial display position.

In a possible implementation, the capturing module 31 is configured to detect a position and pose change amount of the target object in the video; the determining module 33 is configured to determine a position and pose change amount of the object model based on the position and pose change amount of the target object and the position and pose mapping relationship; and the adjusting module 34 is configured to adjust the position of the fluid displayed in the user display interface based on the position and pose change amount of the object model.

In a possible implementation, in an operation of detecting a position and pose change amount of the target object in the video, the capturing module 31 is configured to detect a position change amount and a pose change amount of the target object in the video. The position and pose mapping relationship includes a first mapping relationship between the position change amount of the target object and a position change amount of the object model, and a second mapping relationship between the pose change amount of the target object and a pose change amount of the object model.

In a possible implementation, in an operation of determining a position and pose change amount of the object model based on the position and pose change amount of the target object and the position and pose mapping relationship, the determining module 33 is configured to: determine the position change amount of the object model based on the position change amount of the target object and the first mapping relationship; and determine the pose change amount of the object model based on the pose change amount of the target object and the second mapping relationship.

In a possible implementation, in an operation of adjusting the position of the fluid displayed in the user display interface based on the position and pose change amount of the object model, the adjusting module 34 is configured to determine a position of each model particle of the object model based on the position change amount of the object model; and perform following operations for each fluid particle in the fluid: acquiring a position of the fluid particle; determining the model particle that collides with the fluid particle based on the position of each model particle and the position of the fluid particle; and adjusting the position of the fluid particle based on the position of the model particle that collides with the fluid particle.

In a possible implementation, for each fluid particle that collides with the model particle, the adjusting module 34 is configured to: determine a position correction amount of the fluid particle based on the position of the fluid particle and the position of the model particle that collides with the fluid particle; and adjust the position of the fluid particle that collides with the model particle based on the position correction amount, to dynamically display the movement change of the fluid in the user display interface.

In a possible implementation, in an operation of determining a position correction amount of the fluid particle based on the position of the fluid particle and the position of the model particle that collides with the fluid particle, the adjusting module 34 is configured to: acquire normal direction information of the model particle that collides with the fluid particle; acquire a first weight corresponding to the normal direction information and a second weight corresponding to a first distance between the fluid particle and the model particle that collides with the fluid particle; and determine the position correction amount of the fluid particle based on the first distance, the normal direction information, the first weight, the second weight and a preset distance.

The interactive dynamic fluid effect processing apparatus according to the embodiment of the disclosure can perform the interactive dynamic fluid effect processing method according to the embodiment of the disclosure, implementation principles of the apparatus and the method are similar. The actions performed by each module of the interactive dynamic fluid effect processing apparatus according to the embodiment of the disclosure correspond to the steps in the interactive dynamic fluid effect processing method according to the embodiment of the disclosure. For the detailed function description of each module of the interactive dynamic fluid effect processing apparatus, the above description of the corresponding interactive dynamic fluid effect processing method may be referred, which is not be repeated here.

According to the interactive dynamic fluid effect processing apparatus provided in the embodiments of the disclosure, a video is captured and position and pose change of a target object in the video is detected, a position and pose mapping relationship between the target object and an object model corresponding to a first object displayed in a user display interface is acquired, position and pose change of the object model is determined based on the position and pose change of the target object and the position and pose mapping relationship; and a position of a fluid displayed in the user display interface is adjusted based on the position and pose change of the object model, and movement change of the fluid is dynamically displayed in the user display interface. By adopting the technical solutions provided by the present disclosure, the movement change of the object and the fluid in the user display interface is controlled based on the position and pose change of the target object in the captured video. The interaction mode is novel and interesting, which can improve the user experience.

Figure 4:
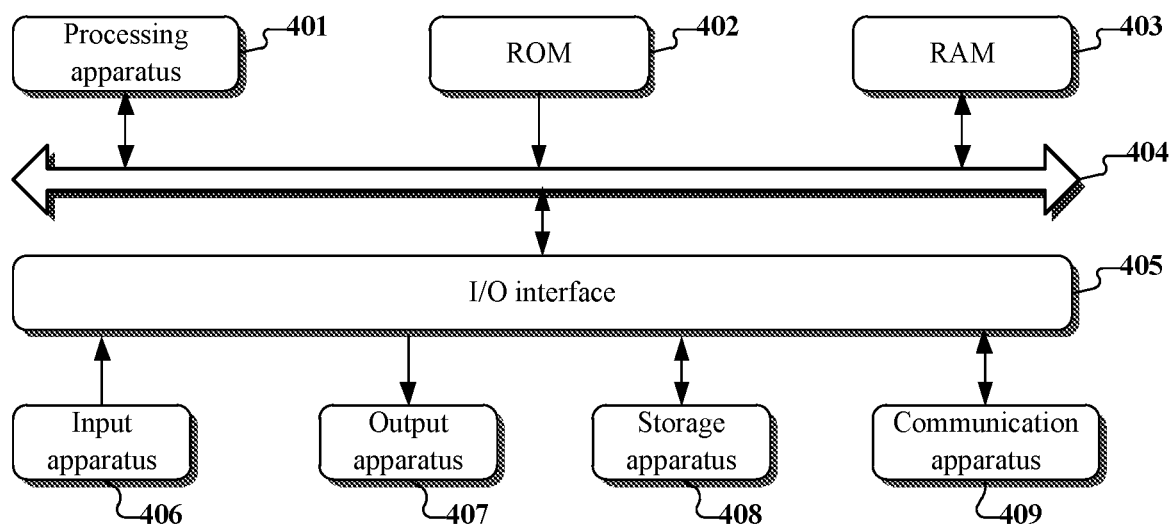
FIG. 4 is a schematic structural diagram of an electronic device according to an embodiment of the present disclosure.

Reference is made to FIG. 4 below, which is a schematic structural diagram illustrating an electronic device 400 for implementing the embodiment of the present disclosure. The execution body of the technical solution of the embodiments of the present disclosure may include but is not limited to mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), and stationary terminals such as digital TVs, and desktop computers. The electronic device shown in FIG. 4 is only an example, and should not impose any limitation on the functionalities and scope of use of the embodiments of the present disclosure.

The electronic device includes a processor and a memory for storing a program for executing the method described in the method embodiments. The processor is configured to execute the program stored in the memory to realize the functions of the embodiments of the present disclosure described above and/or other desired functions. The processor here may be referred to as the processing apparatus 401 described below. The memory may include at least one of a read only memory (ROM) 402, a random-access memory (RAM) 403, and a storage apparatus 408 hereinafter.

As shown in FIG. 4, the electronic device 400 may include a processing apparatus (e.g., a central processing unit or a graphics processing unit) 401. The processing apparatus 401 may perform various appropriate actions and processing according to a program stored in the read only memory (ROM) 402 or a program loaded from a storage apparatus 408 into the random-access memory (RAM) 403. Various programs and data necessary for the operation of the electronic device 400 are also stored in the RAM 403. The processing apparatus 401, the ROM 402, and the RAM 403 are connected to each other via a bus 404. An input/output (I/O) interface 405 is also connected to the bus 404.

Generally, the following components may be connected to the I/O interface 405: an input apparatus 406 including, for example, a touch screen, a touch pad, a keyboard, a mouse, a camera, a microphone, an accelerometer, and a gyroscope; an output apparatus 407 including, for example, a liquid crystal display (LCD), a speaker and a vibrator; a storage apparatus 408 including, for example, a tape and a hard disk; and a communication apparatus 409. The communication apparatus 409 may allow the electronic device 400 to communicate wirelessly or by wire with other devices to exchange data. Although FIG. 4 shows the electronic device 400 having various apparatuses, it should be understood that not all of the illustrated apparatuses are necessarily implemented or provided. Instead, more or fewer apparatuses may be implemented or provided.

In particular, the processing described above with reference to the flowcharts may be implemented as computer software programs according to an embodiment of the present disclosure. For example, a computer program product is provided according to an embodiment of the present disclosure. The computer program product includes a computer program carried by a non-transitory computer readable medium. The computer program includes program code for performing the method in the above embodiments. In such embodiment, the computer program may be downloaded and installed from the network via the communication apparatus 409, or from the storage apparatus 408, or from the ROM 402. The computer program, when being executed by the processing apparatus 401, implements the functionalities defined in the method according to the embodiment of the present disclosure.

It should be noted that the computer readable medium according to the present disclosure may be a computer readable signal medium or a computer readable storage medium, or any combination of the above two. The computer readable storage medium may be, for example, but not limited to, an electrical, magnetic, optical, electromagnetic, infrared, or semiconductor system, apparatus or device, or a combination of any of the above. More specific examples of the computer readable storage medium may include, but are not limited to, an electrical connections with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. According to the present disclosure, the computer readable storage medium may be any tangible medium that contains or stores a program. The program may be used by or in conjunction with an instruction execution system, apparatus or device. In the present disclosure, the computer readable signal medium may include a data signal propagated in baseband or as part of a carrier wave with computer readable program code embodied thereon. The data signal propagated in this manner may be in various forms, including but not limited to an electromagnetic signal, an optical signal, or any suitable combination of the foregoing. The computer readable signal medium may also be any computer readable medium other than the computer readable storage medium. The computer readable signal medium may transmit, propagate, or transport the program for use by or in connection with the instruction execution system, apparatus, or device. The program code embodied on the computer readable medium may be transmitted over any suitable medium including, but not limited to, an electrical wire, an optical fiber cable, RF (radio frequency), or any suitable combination of the foregoing.

In some embodiments, the client terminal and the server may perform communications based on any currently known or future developed network protocol such as HTTP (Hypertext Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., the ad hoc peer-to-peer network), as well as any currently known or future developed networks.

The computer readable medium may be included in the electronic device, or may exist alone without being incorporated into the electronic device.

The computer readable medium carries one or more programs that, when being executed by the electronic device, cause the electronic device to: capture a video and detect position and pose change of a target object in the video; acquire a position and pose mapping relationship between the target object and an object model corresponding to a first object displayed in a user display interface; determine position and pose change of the object model based on the position and pose change of the target object and the position and pose mapping relationship; and adjust a position of a fluid displayed in the user display interface based on the position and pose change of the object model, and dynamically display movement change of the fluid in the user display interface.

The computer program code for performing operations according to the present disclosure may be written in one or more programming languages, or a combination thereof. Such programming languages include, but are not limited to, object-oriented programming languages, such as Java, Smalltalk, C++, and conventional procedural programming languages, such as the "C" language or similar programming languages. The program code may be executed entirely on a user computer, partly on a user computer, as a stand-alone software package, partly on a user computer and partly on a remote computer, or entirely on a remote computer or server. In the case of a remote computer, the remote computer may be connected to a user computer over any kind of network, including a local area network (LAN) or a wide area network (WAN), or may be connected to an external computer (e.g., over the Internet provided by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of code. The module, segment, or portion of code contains one or more executable instructions for implementing the specified logical functionalities. It should be noted that, in some alternative implementations, the functionalities noted in the blocks may be performed in an order different from the order noted in the drawings. For example, two blocks shown in succession may in fact be performed concurrently or in reverse, depending upon the functionalities involved. It should further be noted that each block in the block diagrams and/or flowcharts and combinations of blocks in the block diagrams and/or flowcharts may be implemented by special purpose hardware-based systems that perform specified functionalities or operations, or by combinations of special purpose hardware and computer instructions.

The modules or units involved in the embodiments of the present disclosure may be implemented in software or hardware. The name of a module or unit does not, in any case, qualify the module or unit itself.

The functionalities described herein above may be performed, at least in part, by one or more hardware logic components. For example, without limitation, illustrative hardware logic components that may be used include: Field Programmable Gate Array (FPGA), Application Specific Integrated Circuit (ASIC), Application Specific Standard Products (ASSP), Systems on Chip (SOC), Complex Programmable Logic Device (CPLD) and so on.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the foregoing. More specific examples of the machine-readable storage medium may include: an electrical connection based on one or more wires, a portable computer disk, a hard disk, a random-access memory (RAM), a read only memory (ROM), an erasable programmable read only memory (EPROM or flash memory), a fiber optic cable, a portable compact disk read only memory (CD-ROM), an optical storage device, a magnetic storage device, or any suitable combination of the foregoing.

According to one or more embodiments of the present disclosure, the present disclosure provides an interactive dynamic fluid effect processing method. The method includes: capturing a video and detecting position and pose change of a target object in the video; acquiring a position and pose mapping relationship between the target object and an object model corresponding to a first object displayed in a user display interface; determining position and pose change of the object model based on the position and pose change of the target object and the position and pose mapping relationship; and adjusting a position of a fluid displayed in the user display interface based on the position and pose change of the object model, and dynamically displaying movement change of the fluid in the user display interface.

In a possible implementation, the method further includes: receiving a display triggering operation for the user display interface from a user; displaying the user display interface, and invoking a video capturing apparatus to capture a video; detecting a target object in the video, and acquiring a position of the detected target object in the user display interface; determining an initial display position of the first object in the user display interface based on the position of the target object in the user display interface; and displaying the first object in the user display interface based on the initial display position.

In a possible implementation, the detecting position and pose change of a target object in the video includes: detecting a position and pose change amount of the target object in the video; the determining position and pose change of the object model corresponding to a first object based on the position and pose change of the target object and the position and pose mapping relationship includes: determining a position and pose change amount of the object model based on the position and pose change amount of the target object and the position and pose mapping relationship; and the adjusting a position of a fluid displayed in the user display interface based on the position and pose change of the object model includes: adjusting the position of the fluid displayed in the user display interface based on the position and pose change amount of the object model.

In a possible implementation, the detecting a position and pose change amount of the target object in the video includes detecting a position change amount and a pose change amount of the target object in the video. The position and pose mapping relationship includes a first mapping relationship between the position change amount of the target object and a position change amount of the object model, and a second mapping relationship between the pose change amount of the target object and a pose change amount of the object model.

In a possible implementation, the determining a position and pose change amount of the object model based on the position and pose change amount of the target object and the position and pose mapping relationship includes: determining the position change amount of the object model based on the position change amount of the target object and the first mapping relationship; and determining the pose change amount of the object model based on the pose change amount of the target object and the second mapping relationship.

In a possible implementation, the adjusting the position of the fluid displayed in the user display interface based on the position and pose change amount of the object model includes: determining a position of each model particle of the object model based on the position change amount of the object model; and performing following operations for each fluid particle in the fluid: acquiring a position of the fluid particle; determining the model particle that collides with the fluid particle based on the position of each model particle and the position of the fluid particle; and adjusting the position of the fluid particle based on the position of the model particle that collides with the fluid particle.

In a possible implementation, for each fluid particle that collides with the model particle, the adjusting the position of the fluid particle based on the position of the model particle that collides with the fluid particle includes: determining a position correction amount of the fluid particle based on the position of the fluid particle and the position of the model particle that collides with the fluid particle; and adjusting the position of the fluid particle that collides with the model particle based on the position correction amount, to dynamically display the movement change of the fluid in the user display interface.

In a possible implementation, the determining a position correction amount of the fluid particle based on the position of the fluid particle and the position of the model particle that collides with the fluid particle includes: acquiring normal direction information of the model particle that collides with the fluid particle; acquiring a first weight corresponding to the normal direction information and a second weight corresponding to a first distance between the fluid particle and the model particle that collides with the fluid particle; and determining the position correction amount of the fluid particle based on the first distance, the normal direction information, the first weight, the second weight and a preset distance.

According to one or more embodiments of the present disclosure, the present disclosure provides an interactive dynamic fluid effect processing apparatus. The apparatus includes: a capturing module configured to capture a video and detect position and pose change of a target object in the video; an acquiring module configured to acquire a position and pose mapping relationship between the target object and an object model corresponding to a first object displayed in a user display interface; a determining module configured to determine position and pose change of the object model based on the position and pose change of the target object and the position and pose mapping relationship; and an adjusting module configured to adjust a position of a fluid displayed in the user display interface based on the position and pose change of the object model, and dynamically display movement change of the fluid in the user display interface.

In a possible implementation, the apparatus further includes a receiving module configured to: receive a display triggering operation for the user display interface from a user; display the user display interface, and invoke a video capturing apparatus to capture a video; detect a target object in the video, and acquire a position of the detected target object in the user display interface; determine an initial display position of the first object in the user display interface based on the position of the target object in the user display interface; and display the first object in the user display interface based on the initial display position.

In a possible implementation, the capturing module is configured to detect a position and pose change amount of the target object in the video; the determining module is configured to determine a position and pose change amount of the object model based on the position and pose change amount of the target object and the position and pose mapping relationship; and the adjusting module is configured to adjust the position of the fluid displayed in the user display interface based on the position and pose change amount of the object model.

In a possible implementation, in an operation of detecting a position and pose change amount of the target object in the video, the capturing module is configured to detect a position change amount and a pose change amount of the target object in the video. The position and pose mapping relationship includes a first mapping relationship between the position change amount of the target object and a position change amount of the object model, and a second mapping relationship between the pose change amount of the target object and a pose change amount of the object model.

In a possible implementation, in an operation of determining a position and pose change amount of the object model based on the position and pose change amount of the target object and the position and pose mapping relationship, the determining module is configured to: determine the position change amount of the object model based on the position change amount of the target object and the first mapping relationship; and determine the pose change amount of the object model based on the pose change amount of the target object and the second mapping relationship.

In a possible implementation, in an operation of adjusting the position of the fluid displayed in the user display interface based on the position and pose change amount of the object model, the adjusting module is configured to determine a position of each model particle of the object model based on the position change amount of the object model; and perform following operations for each fluid particle in the fluid: acquiring a position of the fluid particle; determining the model particle that collides with the fluid particle based on the position of each model particle and the position of the fluid particle; and adjusting the position of the fluid particle based on the position of the model particle that collides with the fluid particle.

In a possible implementation, for each fluid particle that collides with the model particle, the adjusting module is configured to: determine a position correction amount of the fluid particle based on the position of the fluid particle and the position of the model particle that collides with the fluid particle; and adjust the position of the fluid particle that collides with the model particle based on the position correction amount, to dynamically display the movement change of the fluid in the user display interface.

In a possible implementation, in an operation of determining a position correction amount of the fluid particle based on the position of the fluid particle and the position of the model particle that collides with the fluid particle, the adjusting module is configured to: acquire normal direction information of the model particle that collides with the fluid particle; acquire a first weight corresponding to the normal direction information and a second weight corresponding to a first distance between the fluid particle and the model particle that collides with the fluid particle; and determine the position correction amount of the fluid particle based on the first distance, the normal direction information, the first weight, the second weight and a preset distance.

According to one or more embodiments of the present disclosure, the present disclosure provides an electronic device. The electronic device includes one or more processors and a memory storing one or more programs. The one or more programs, when executed by the one or more processors, cause the electronic device to perform the interactive dynamic fluid effect processing method.

According to one or more embodiments of the present disclosure, the present disclosure provides a computer-readable medium. The computer-readable medium stores computer instructions. The computer instructions, when executed by a computer, cause the computer to perform the interactive dynamic fluid effect processing method.

The above description merely shows preferred embodiments according to the present disclosure and an illustration of the technical principles employed. Those skilled in the art should understand that the scope of disclosure involved in the present disclosure should cover other technical solutions formed by any combination of the above technical features or their equivalents without departing from the above disclosed concept, for example, a technical solution formed by replacing the above features with technical features (but not limited to) having functions similar to that disclosed in the present disclosure, rather than being limited to the technical solutions formed by the specific combination of the above technical features.

Additionally, although operations are illustrated in a particular order, the operations should not be construed as being performed in the particular order shown or in a sequential order necessarily. Under certain circumstances, multitasking and parallel processing may be advantageous. Likewise, the several implementation-specific details discussed above should not be construed as limitations on the scope of the present disclosure. Some features that are described in the context of separate embodiments may also be implemented in combination in a single embodiment. Alternatively, various features that are described in the context of a single embodiment may also be implemented in multiple embodiments separately or in any suitable sub-combination.

Although the subject matter has been described in languages specific to structural features and/or logical acts of method, it should understand that the subject matter defined in the appended claims is unnecessarily limited to the specific features or acts described above. Instead, the features and acts described above are merely example forms of implementing the claims.

What is claimed is:

1. An interactive dynamic fluid effect processing method, comprising:
    capturing a video and detecting position and pose change of a target object in the video;
    acquiring a position and pose mapping relationship between the target object and an object model corresponding to a first object displayed in a user display interface;
    determining position and pose change of the object model based on the position and pose change of the target object and the position and pose mapping relationship; and
    adjusting a position of a fluid displayed in the user display interface based on the position and pose change of the object model, and dynamically displaying movement change of the fluid in the user display interface.

2. The interactive dynamic fluid effect processing method according to claim 1, further comprising:
    receiving a display triggering operation for the user display interface from a user;
    displaying the user display interface, and invoking a video capturing apparatus to capture a video;
    detecting a target object in the video, and acquiring a position of the detected target object in the user display interface;
    determining an initial display position of the first object in the user display interface based on the position of the target object in the user display interface; and
    displaying the first object in the user display interface based on the initial display position.

3. The interactive dynamic fluid effect processing method according to claim 1, wherein the detecting position and pose change of a target object in the video comprises:
    detecting a position and pose change amount of the target object in the video;
    the determining position and pose change of the object model corresponding to a first object based on the position and pose change of the target object and the position and pose mapping relationship comprises:
        determining a position and pose change amount of the object model based on the position and pose change amount of the target object and the position and pose mapping relationship; and
        the adjusting a position of a fluid displayed in the user display interface based on the position and pose change of the object model comprises:
            adjusting the position of the fluid displayed in the user display interface based on the position and pose change amount of the object model.

4. The interactive dynamic fluid effect processing method according to claim 3, wherein the detecting a position and pose change amount of the target object in the video comprises:
    detecting a position change amount and a pose change amount of the target object in the video, wherein the position and pose mapping relationship comprises a first mapping relationship between the position change amount of the target object and a position change amount of the object model, and a second mapping relationship between the pose change amount of the target object and a pose change amount of the object model.

5. The interactive dynamic fluid effect processing method according to claim 4, wherein the determining a position and pose change amount of the object model based on the position and pose change amount of the target object and the position and pose mapping relationship comprises:
    determining the position change amount of the object model based on the position change amount of the target object and the first mapping relationship; and
    determining the pose change amount of the object model based on the pose change amount of the target object and the second mapping relationship.

6. The interactive dynamic fluid effect processing method according to claim 4, wherein the adjusting the position of the fluid displayed in the user display interface based on the position and pose change amount of the object model comprises:
    determining a position of each model particle of the object model based on the position change amount of the object model; and
    performing following operations for each fluid particle in the fluid:
        acquiring a position of the fluid particle;
        determining the model particle that collides with the fluid particle based on the position of each model particle and the position of the fluid particle; and
        adjusting the position of the fluid particle based on the position of the model particle that collides with the fluid particle.

7. The interactive dynamic fluid effect processing method according to claim 6, wherein for each fluid particle that collides with the model particle, the adjusting the position of the fluid particle based on the position of the model particle that collides with the fluid particle comprises:
    determining a position correction amount of the fluid particle based on the position of the fluid particle and the position of the model particle that collides with the fluid particle; and
    adjusting the position of the fluid particle that collides with the model particle based on the position correction amount, to dynamically display the movement change of the fluid in the user display interface.

8. The interactive dynamic fluid effect processing method according to claim 7, wherein the determining a position correction amount of the fluid particle based on the position of the fluid particle and the position of the model particle that collides with the fluid particle comprises:
    acquiring normal direction information of the model particle that collides with the fluid particle;
    acquiring a first weight corresponding to the normal direction information and a second weight corresponding to a first distance between the fluid particle and the model particle that collides with the fluid particle; and
    determining the position correction amount of the fluid particle based on the first distance, the normal direction information, the first weight, the second weight and a preset distance.

9. An interactive dynamic fluid effect processing apparatus, comprising:
- at least one processor, and
- at least one memory communicatively coupled to the at least one processor and storing instructions that upon execution by the at least one processor cause the apparatus to:
  - capture a video and detect position and pose change of a target object in the video;
  - acquire a position and pose mapping relationship between the target object and an object model corresponding to a first object displayed in a user display interface;
  - determine position and pose change of the object model based on the position and pose change of the target object and the position and pose mapping relationship; and
  - adjust a position of a fluid displayed in the user display interface based on the position and pose change of the object model, and dynamically display movement change of the fluid in the user display interface.

10. A computer-readable non-transitory storage medium, bearing computer-readable instructions that upon execution on a computing device cause the computing device at least to:
- capture a video and detect position and pose change of a target object in the video;
- acquire a position and pose mapping relationship between the target object and an object model corresponding to a first object displayed in a user display interface;
- determine position and pose change of the object model based on the position and pose change of the target object and the position and pose mapping relationship; and
- adjust a position of a fluid displayed in the user display interface based on the position and pose change of the object model, and dynamically display movement change of the fluid in the user display interface.

11. The apparatus of claim 9, the at least one memory further storing instructions that upon execution by the at least one processor cause the apparatus to:
- receive a display triggering operation for the user display interface from a user;
- display the user display interface, and invoking a video capturing apparatus to capture a video;
- detect a target object in the video, and acquiring a position of the detected target object in the user display interface;
- determine an initial display position of the first object in the user display interface based on the position of the target object in the user display interface; and
- display the first object in the user display interface based on the initial display position.

12. The apparatus of claim 9, the at least one memory further storing instructions that upon execution by the at least one processor cause the apparatus to:
- detect a position and pose change amount of the target object in the video;
- the determining position and pose change of the object model corresponding to a first object based on the position and pose change of the target object and the position and pose mapping relationship comprises:
- determine a position and pose change amount of the object model based on the position and pose change amount of the target object and the position and pose mapping relationship; and
- the adjusting a position of a fluid displayed in the user display interface based on the position and pose change of the object model comprises:
- adjust the position of the fluid displayed in the user display interface based on the position and pose change amount of the object model.

13. The apparatus of claim 12, the at least one memory further storing instructions that upon execution by the at least one processor cause the apparatus to:
- detect a position change amount and a pose change amount of the target object in the video, wherein
- the position and pose mapping relationship comprises a first mapping relationship between the position change amount of the target object and a position change amount of the object model, and a second mapping relationship between the pose change amount of the target object and a pose change amount of the object model.

14. The apparatus of claim 13, the at least one memory further storing instructions that upon execution by the at least one processor cause the apparatus to:
- determine the position change amount of the object model based on the position change amount of the target object and the first mapping relationship; and
- determine the pose change amount of the object model based on the pose change amount of the target object and the second mapping relationship.

15. The apparatus of claim 13, the at least one memory further storing instructions that upon execution by the at least one processor cause the apparatus to:
- determine a position of each model particle of the object model based on the position change amount of the object model; and
- perform following operations for each fluid particle in the fluid:
  - acquire a position of the fluid particle;
  - determine the model particle that collides with the fluid particle based on the position of each model particle and the position of the fluid particle; and
  - adjust the position of the fluid particle based on the position of the model particle that collides with the fluid particle.

16. The apparatus of claim 15, the at least one memory further storing instructions that upon execution by the at least one processor cause the apparatus to:
- determine a position correction amount of the fluid particle based on the position of the fluid particle and the position of the model particle that collides with the fluid particle; and
- adjust the position of the fluid particle that collides with the model particle based on the position correction amount, to dynamically display the movement change of the fluid in the user display interface.

17. The apparatus of claim 16, the at least one memory further storing instructions that upon execution by the at least one processor cause the apparatus to:
- acquire normal direction information of the model particle that collides with the fluid particle;
- acquire a first weight corresponding to the normal direction information and a second weight corresponding to a first distance between the fluid particle and the model particle that collides with the fluid particle; and
- determine the position correction amount of the fluid particle based on the first distance, the normal direction information, the first weight, the second weight and a preset distance.

* * * * *